United States Patent
Zhao et al.

(10) Patent No.: US 8,551,273 B2
(45) Date of Patent: Oct. 8, 2013

(54) METHOD FOR FORMING FLUOROPLASTIC ARTICLES

(75) Inventors: Wei Zhao, Wanzhou (CN); Guolong Chen, Wanzhou (CN); Yonggao Zhao, Wanzhou (CN)

(73) Assignee: Yonggao Zhao, Zhejiang (CN)

( * ) Notice: Subject to any disclaimer, the term of this patent is extended or adjusted under 35 U.S.C. 154(b) by 713 days.

(21) Appl. No.: 12/371,529

(22) Filed: Feb. 13, 2009

(65) Prior Publication Data

US 2009/0145535 A1 Jun. 11, 2009

Related U.S. Application Data

(62) Division of application No. 11/501,152, filed on Aug. 7, 2006, now abandoned.

(30) Foreign Application Priority Data

Jan. 25, 2006 (CN) .......................... 2006 1 0023720

(51) Int. Cl.
*B29C 63/10* (2006.01)
*B65H 81/00* (2006.01)

(52) U.S. Cl.
USPC ........... 156/163; 156/165; 156/188; 156/190; 156/191; 29/469.5

(58) Field of Classification Search
None
See application file for complete search history.

(56) References Cited

U.S. PATENT DOCUMENTS

| | | |
|---|---|---|
| 2,116,668 A | 5/1938 | Cross |
| 4,029,837 A | 6/1977 | Leatherman |
| 4,122,142 A * | 10/1978 | Lawrence et al. ............. 264/522 |
| 4,974,303 A | 12/1990 | Zhao |
| 5,968,318 A * | 10/1999 | Hasegawa et al. ......... 162/358.4 |
| 6,204,301 B1 | 3/2001 | Oshima et al. |

* cited by examiner

*Primary Examiner* — Barbara J Musser
(74) *Attorney, Agent, or Firm* — Christie, Parker & Hale, LLP

(57) ABSTRACT

The present invention relates to a method for forming fluoroplastic articles including inner and outer fluoroplastic layers and a metal meshwork, the metal meshwork being arranged between the inner and outer fluoroplastic layers, characterized by the meshwork being stretchable and compressible in an axial direction.

2 Claims, 1 Drawing Sheet

METHOD FOR FORMING FLUOROPLASTIC ARTICLES

CROSS-REFERENCE TO RELATED APPLICATIONS

This application is a divisional of U.S. patent application Ser. No. 11/501,152, filed Aug. 7, 2006, now abandoned which claims the priority of Chinese Patent Application No. 200610023720.5, filed Jan. 25, 2006, the entire content of which is incorporated herein by reference.

FIELD OF THE INVENTION

The present invention relates to a fluoroplastic article, particularly to a fluoroplastic article with liner made of metal meshwork.

DESCRIPTION OF THE RELATED ART

It is well known that fluoroplastic, particularly polytetrafluoroethylene plastic (which may be referred to as F4 or PTFE) is used as liners of steel members such as anticorrosive tubes, towers and vessels. When an article made of F4 is used as the liner of a steel member, due to a large difference in thermal coefficient of expansion between the article and the steel member, they will usually be destroyed during use. This has restricted the wide use of this new material in anticorrosive fields. Therefore, the inventor has proposed an F4 liner with metal web laid in it, such that the excessive expansion of an anticorrosive article made of F4 is restricted during heating, so as to increase the life of the F4 liner. However, as shown in FIG. 1, the grids of the metal web in the above solution are rigid squares, that is, the wires of the web are fixedly connected with each other, so the metal web cannot be stretched and compressed optionally. There are two shortcomings existing in the web with this structure: 1) Since the grids of the metal web cannot be stretched and compressed, when the fluoroplastic article is placed into a tube, for example, and is expanded to be flanged at the two ends, the metal web in the fluoroplastic article cannot be flanged together with the fluoroplastic layer. Thus, the quality and performance of the fluoroplastic article are deteriorated. 2) In the winding process for producing the fluoroplastic article, the metal web with the above structure can merely be laid outside of the fluoroplastic belt, but cannot be made into meshwork and placed in between the fluoroplastic layers. Because the diameter of the meshwork with this structure is not stretchable and compressible, it is difficult to closely abut the meshwork against the fluoroplastic inner layer, and when the fluoroplastic belt is wound outside of the fluoroplastic inner layer, the web will be distorted. When the article is sintered at a high temperature, since the F4 belt, metal web and glass belt cannot be closely pressed against each other, the inner pressure due to the expansion is insufficient, and the metal web will be disorderly and displaced. Thus, the finished articles will have a low density and there will be small holes in the structure. In addition, these articles will have a trend to crack and will have a high ratio of defective and waste products.

SUMMARY OF THE INVENTION

The problem to be solved by the present invention is to provide a fluoroplastic article with a liner made of metal meshwork. This fluoroplastic article can overcome above shortcomings arising in prior fluoroplastic articles, whose liners are made of metal web with fixed grids.

The fluoroplastic article according to the present invention is composed of inner and outer fluoroplastic layers and a metal meshwork. The metal meshwork arranged between the inner and outer fluoroplastic layers can be stretched and compressed in the axial direction.

In order to stretch and compress the metal meshwork in the axial direction, the grids of the metal meshwork have a variable rhombic shape. They are formed by interweaving metal wires or by welding metal webs having stretchable and compressible rhombic grids.

The advantage of the invention is set forth in the following: 1) Since the metal meshwork is stretchable and compressible, it can be compressed according to the diameter of the inner layer of the wound fluoroplastic article. As the result of being compressed, the diameter of the meshwork expands to be larger than that of the inner layer of the fluoroplastic article. Then, the inner layer of the fluoroplastic article is sheathed by the compressed meshwork. The compressed meshwork is stretched and the diameter becomes smaller. In this way, the meshwork abuts against the outside of the inner layer. Next, the fluoroplastic outer layer is continuously wound around the meshwork. During winding, the grids of the metal meshwork vary with the state of winding and forces. Thus, the metal meshwork is arranged between the inner and outer layer of the fluoroplastic article easily, neatly, normally and uniformly without any disorders and displacements. Thereby, both quality and yield of articles are improved. 2) Since the diameter of the meshwork is variable, when the fluoroplastic article with the metal meshwork is lined in a metal member, the metal meshwork can be flanged together with the fluoroplastic layer. Therefore, both quality and performance of the member are improved. 3) Since the force applied to different parts of the meshwork is uniform, the article does not deform at a high temperature. 4) During manufacturing and use, the meshwork will elongate longitudinally and the diameter will expand in the transverse direction with the rise of temperature. However, since the product of the diameter and the length of the meshwork is a constant, the tendency to elongate longitudinally and the tendency to expand transversely are restricted with each other, both the length and the diameter of the meshwork cannot change. Thus, the performance of expanding with heat and contracting with cold of the article is in an optimum state. 5) Since the metal meshwork of the article is stretchable, during winding or while being sintered at high temperature, the meshwork is not displaced and will abut against inner and outer fluoroplastic layers closely. Thus, the problem arising from a metal web with invariable grids is avoided, and the sintered article has high density and strength, in addition to having good quality and a high yield. Furthermore, the finished article has a smooth surface and also has no blowholes or cracks.

Detailed description of exemplary embodiments will be described in conjunction with the accompanying drawings.

DETAILED DESCRIPTION OF EXEMPLARY EMBODIMENTS

Figure 5:
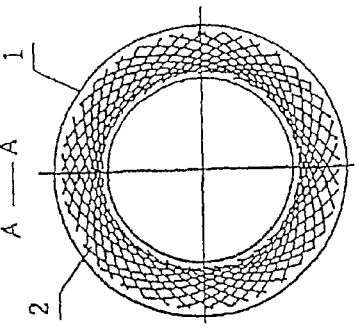
FIG. 5 is a schematic view of the change of metal meshwork according to the invention in the flanged portion, this portion is formed by the metal meshwork engaged with a tube.
Figure 6:
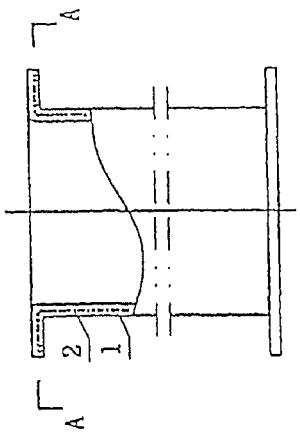
FIG. 6 is a cross-sectional view taken along the line A-A in FIG. 5.
Figure 3:
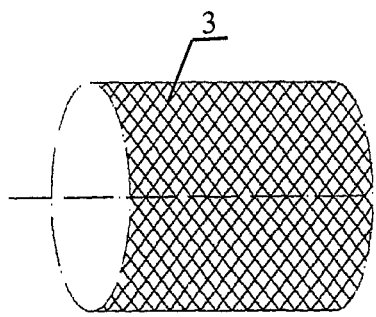
FIG. 3 is a schematic view of the metal meshwork in FIG. 2, which is in a compressed state.
Figure 4:
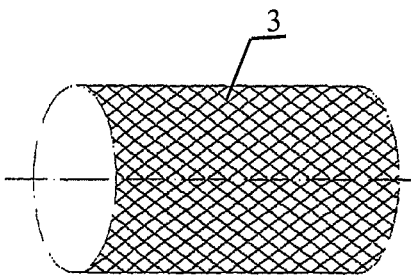
FIG. 4 is a schematic view of the metal meshwork in FIG. 2, which is in a stretched state.
Figure 1:
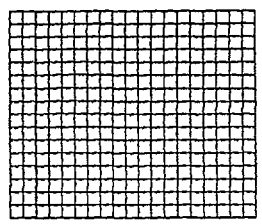
FIG. 1 is a schematic view of the square web with fixed grids, which is used in prior fluoroplastic articles.
Figure 2:
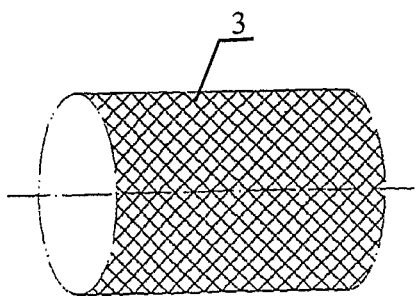
FIG. 2 is a schematic view of the metal meshwork according to the invention, which has variable rhombic grids.

The embodiment shown in FIG. 2, FIG. 5 and FIG. 6 is a fluoroplastic article with a metal meshwork. It is used as liners of metal tubes and is composed of inner and outer fluoroplastic layers 1 and a metal meshwork 2. The metal meshwork 2 is arranged between the inner and outer fluoroplastic layers. The grids 3 of the metal meshwork 2 have variable rhombic shape and can be formed by interweaving metal wires. They also can be made through welding metal webs with stretchable and compressible rhombic grids. The metal meshwork with such a configuration can be stretched and compressed in an axial direction.

The above fluoroplastic articles with metal meshwork can be made by the following process: (1) A thin fluoroplastic (e.g. F4) belt is wound around a stainless steel mold back and forth until the desired thickness is reached, so as to make the inner fluoroplastic layer of the article. (2) The metal meshwork which is compressible in the axial direction is compressed, so that the diameter of the meshwork is larger than that of the fluoroplastic inner layer. Then, the fluoroplastic inner layer is sheathed by the compressed meshwork. The latter is stretched and its diameter is reduced. As the result, the meshwork closely abuts against the fluoroplastic inner layer. (3) The thin fluoroplastic belt is wound around the metal meshwork until the desired thickness is reached, so as to make the outer fluoroplastic layer of the article. (4) The outer layer is tightly strapped by a glass belt. (5) The strapped fluoroplastic prefabricated article is placed into an oven. The article is finished after being sintered in the oven. The temperature of the sintering oven may be set according to the composition of the fluoroplastic material. When F4 plastic is used, the temperature of the oven is about 380° C.

What is claimed is:

1. A method for producing a thermally stable fluoroplastic article, having inner and outer fluoroplastic layers and a metal meshwork, the metal meshwork being between the inner and outer fluoroplastic layers, and wherein said meshwork is stretchable and compressible in an axial direction, the method comprising:
   (1) winding a thin fluoroplastic belt around a steel mold until the desired thickness is reached, to form the inner fluoroplastic layer;
   (2) compressing the metal meshwork in the axial direction to form a compressed meshwork having a diameter that is larger than the outer diameter of the inner fluoroplastic layer;
   (3) applying the compressed meshwork onto the inner fluoroplastic layer so that the compressed meshwork forms a sheath around the inner fluoroplastic layer;
   (4) stretching the compressed meshwork to reduce the diameter of the metal meshwork such that the metal meshwork closely abuts against the inner fluoroplastic layer and such that grids of the metal meshwork are substantially uniform;
   (5) winding the thin fluoroplastic belt around the metal meshwork until the desired thickness is reached, to form the outer fluoroplastic layer;
   (6) closely strapping the outer layer with a glass belt to form a strapped fluoroplastic; and
   (7) sintering the strapped fluoroplastic article in an oven at about 380° C. to form the fluoroplastic article, the thermally stable fluoroplastic article being thermally stable.

2. The method of claim 1, wherein the produced fluoroplastic article comprises:
   the inner fluoroplastic layer;
   the stretchable and compressible meshwork;
   the outer fluoroplastic layer; and
   the glass belt.

\* \* \* \* \*